(12) United States Patent
Lake et al.

(10) Patent No.: US 8,261,772 B2
(45) Date of Patent: Sep. 11, 2012

(54) MANIFOLD WITH LABEL PLATES

(75) Inventors: Paul J. Lake, Waltham, MA (US);
Jeffrey A. Scilingo, Londonderry, NH (US)

(73) Assignee: Watts Water Technologies, Inc., North Andover, MA (US)

( * ) Notice: Subject to any disclaimer, the term of this patent is extended or adjusted under 35 U.S.C. 154(b) by 102 days.

(21) Appl. No.: 12/872,163

(22) Filed: Aug. 31, 2010

(65) Prior Publication Data
US 2012/0048404 A1 Mar. 1, 2012

(51) Int. Cl.
*E03B 7/07* (2006.01)

(52) U.S. Cl. .......... 137/551; 137/561 R; 40/306; 40/658

(58) Field of Classification Search .................. 137/423, 137/551, 561 R, 561 A, 884; 40/306, 310, 40/316, 642.02, 658, 666; 403/329, 397
See application file for complete search history.

(56) References Cited

U.S. PATENT DOCUMENTS

| | | | | | |
|---|---|---|---|---|---|
| 2,328,806 | A | * | 9/1943 | Hoofer | 40/311 |
| 2,625,131 | A | * | 1/1953 | Sturhahn | 116/308 |
| 2,661,768 | A | * | 12/1953 | Novak et al. | 138/44 |
| 3,791,679 | A | * | 2/1974 | Glover | 285/132.1 |
| 5,131,177 | A | * | 7/1992 | Sy, Jr. | 40/593 |
| 5,638,624 | A | * | 6/1997 | Cornu | 40/316 |
| 6,698,124 | B2 | * | 3/2004 | Kump et al. | 40/642.02 |
| 7,194,829 | B2 | * | 3/2007 | Boire et al. | 40/316 |

* cited by examiner

*Primary Examiner* — Len Tran
*Assistant Examiner* — Reinaldo Sanchez-Medina
(74) *Attorney, Agent, or Firm* — Edwards Wildman Palmer LLP; David J. Silvia; George N. Chaclas

(57) ABSTRACT

A fluid distribution system including an elongated manifold defining fluid ports, lengthwise ridges, and radial ridges. Label plates couple to the manifold and have a planar body with a front side for indicating information related to the respective port. A finger extends from each label plate and has two inwardly turned prongs for coupling to a first lengthwise ridge. The prongs form a space for capturing a radial ridge. A collar also extends from the planar body for coupling to the port. The planar body also has three stiffening bars on a back side thereof. Each stiffening bar includes a feature for coupling to a second lengthwise ridge on the manifold body.

14 Claims, 15 Drawing Sheets

MANIFOLD WITH LABEL PLATES

TECHNICAL FIELD OF THE DISCLOSURE

The present disclosure relates to fluid distribution systems and, more particularly, to a water distribution manifold having label plates to identify manifold ports and the associated lines.

BACKGROUND OF THE DISCLOSURE

The traditional water distribution system has a standard manifold with a central inlet and outlet. Intermediate the central inlet and outlet are a plurality of distribution outlets. As the number of distribution outlets increases, it is advantageous to label the distribution outlets.

In view of the above, several methods for labeling fluid inlets and outlets have been developed. The approaches vary from the simple marking of information with a writing utensil or applying an adhesive label to a visible location. These methods suffer from several drawbacks. For example, it may often become desirable to change the label which is permanently fixed. Additionally, such labeling is not always easily read. Also, cleaning and/or replacement may become necessary. Although possible, such maintenance may be difficult and time consuming.

SUMMARY OF THE DISCLOSURE

In view of the above, there is a need for a manifold with labels that are easily yet selectively secured in place while providing clear indication of the ports. Further, as space is often a concern, the labels should not be undesirably large and cumbersome.

It is an object of the subject technology to provide a new and improved manifold having label plates. The label plates can work with a variety of manifolds.

In one embodiment, the subject technology is directed to a label plate for an elongated fluid distribution manifold having at least one ridge and a plurality of ports. The label plate includes a body, a finger extending from the body for coupling to a lengthwise ridge on the fluid distribution manifold, and a collar extending from the body for coupling to a port on the fluid distribution manifold. The body may have at least one bar including a feature for coupling to an axial ridge on the fluid distribution manifold. The finger may have two prongs for coupling to the lengthwise ridge, which form a space for coupling to a radial ridge.

Another embodiment of the subject disclosure is directed to a fluid distribution system including an elongated manifold having a body defining a plurality of fluid ports, a lengthwise ridge, and a radial ridge. A label plate couples to the manifold to provide information related to the fluid coupled thereto. The label plate has a planar body with a front side for indicating information related to one or more ports of the plurality of ports and a finger extending from the planar body. The finger has a distal end forming two inwardly turned prongs with a space between the prongs, wherein the prongs couple to the lengthwise ridge and the space captures the radial ridge. A collar also extends from the planar body and couples to a port.

Preferably, there are at least two stiffening bars on a back side of the planar body, each stiffening bar including a feature for coupling to a second lengthwise ridge on the manifold body. The features may be aligned channels with projecting tabs surrounding the respective channel. The label plate is preferably resiliently flexible in whole or at least in part.

Still another embodiment of the subject technology is a label plate for an elongated manifold having a body defining a plurality of fluid ports, a first lengthwise ridge and a second lengthwise ridge. The label plate includes a planar body with a front side for indicating information related to at least one of the ports. The planar body has at least one stiffening bar on a back side thereof with a feature for coupling to the first lengthwise ridge on the manifold body. A finger extends from the planar body and has a distal end for coupling to the second lengthwise ridge. A collar extends from the planar body for coupling to a port.

Preferably, the collar has two arcuate arms that form an opening for coupling to the port and distal ends of the arms turn outward to facilitate easy attachment to the port. The distal end of the finger may form two inwardly turned prongs with a space between the prongs, wherein the space captures a radial ridge formed on the manifold body.

It should be appreciated that the present invention can be implemented and utilized in numerous ways, including without limitation as a process, an apparatus, a system, a device, and a method for applications now known and later developed. These and other unique features of the system disclosed herein will become more readily apparent from the following description and the accompanying drawings.

BRIEF DESCRIPTION OF DRAWINGS

Reference is made to the attached drawings, wherein elements having the same reference character designations represent like elements throughout.

DETAILED DESCRIPTION OF PREFERRED EMBODIMENTS

Figure 1:
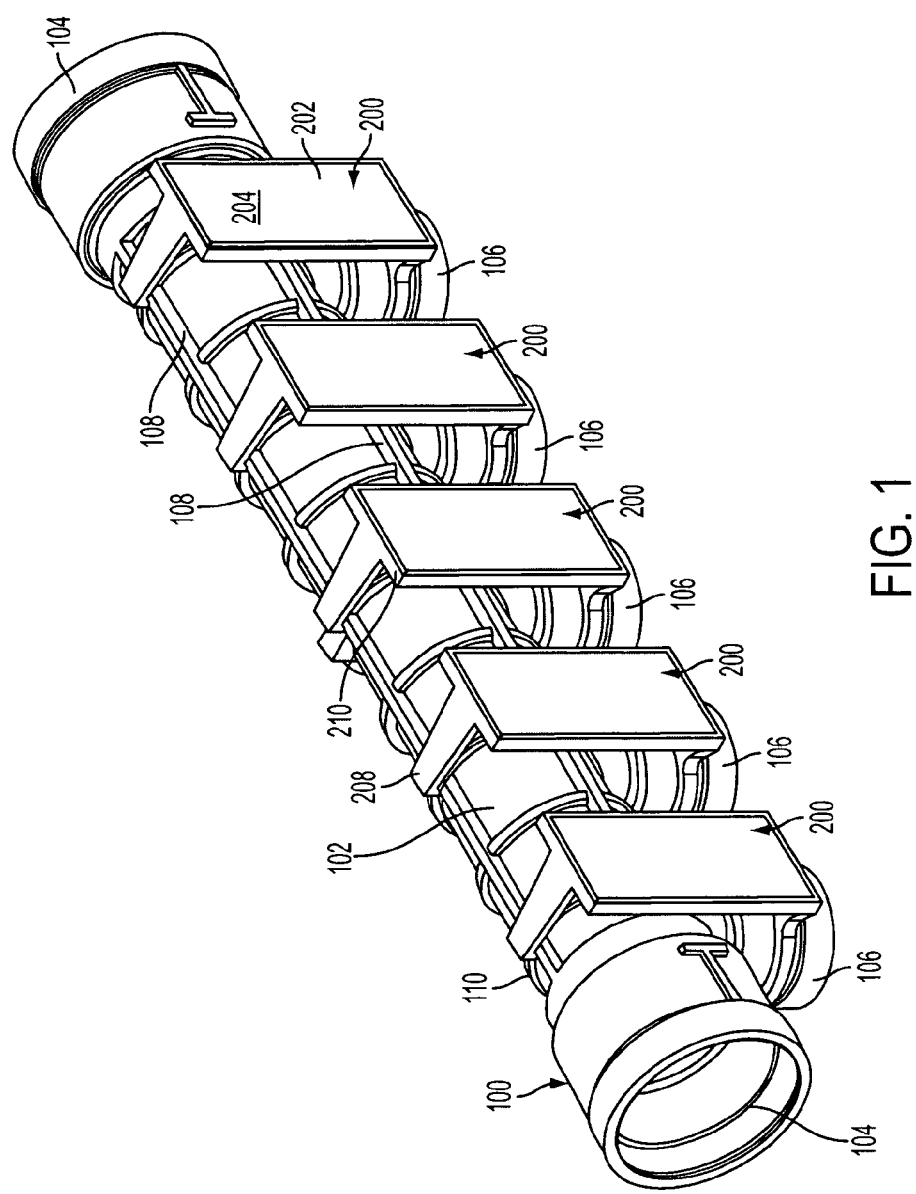
FIG. 1 is an upper front perspective view of a manifold having label plates according to the subject technology.

The present disclosure overcomes many of the prior art problems associated with labels for use on manifolds in fluid distribution systems and like applications. The advantages, and other features of the technology disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

All relative descriptions herein such as front, back, side, left, right, up, and down are with reference to the Figures, and not meant in a limiting sense. Unless otherwise specified, the illustrated embodiments can be understood as providing exemplary features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed systems or methods. Additionally, the shapes and sizes of components are also exemplary and can be altered without materially affecting or limiting the disclosed technology.

Referring to FIGS. 1-11, various views of an elongated manifold 100 having label plates 200 in accordance with the subject disclosure are shown. The manifold 100 has a body 102 defining a plurality of fluid ports 104, 106. The number, orientation and function of the ports 104, 106 may vary depending upon the application. The fluid ports include main inlets 104 and a plurality of distribution outlets 106 intermediate the main inlets 104. As shown, the manifold 100 has five distribution outlets 106.

The manifold 100 may also include other inlets, outlets and other internal structures to vary the function thereof as would be appreciated by those of ordinary skill in the art. For example, a manifold could have multiple inlets (e.g., hot and cold) and the distribution outlets could be configured to selectively distribute hot and/or cold water.

The inlets 104 and outlets 106 of the manifold 100 include fittings for quickly and easily coupling water lines thereto. The body 102 may include valves and various other structures to direct fluid flow therein. It is envisioned that handles to operate the valves could be coupled to the body 102 or the ports 104, 106 without interfering with the application of the subject technology.

Referring additionally now to FIGS. 12-18, various views of a label plate 200 in accordance with the subject disclosure are shown. A label plate 200 couples to each distribution outlet 106 to provide information (not shown) related to the respective distribution outlet 106 and associated fluid line (not shown). The label plates 200 couple to the distribution outlets 106 and ridges 108, 110 formed on the body 102 of the manifold 100 as described in more detail below.

The label plate 200 has a planar body 202 with a front side 204 and a back side 206. Typically, the information on the label plate 200 would be located on the front side 204 of the planar body 202 and relate to the line connected to the outlet 106 such as line size, destination, type of fluid and the like. Color coding may also be used (e.g., a red plate 200 for hot and a blue plate 200 for cold). Additional information can be provided by applying a sticker to the label plate 200 or alternatively changing the label plate 200 to update the information. In another embodiment, the front side 204 of the planar body 202 has a pocket to receive and protect an information placard.

Figure 4:
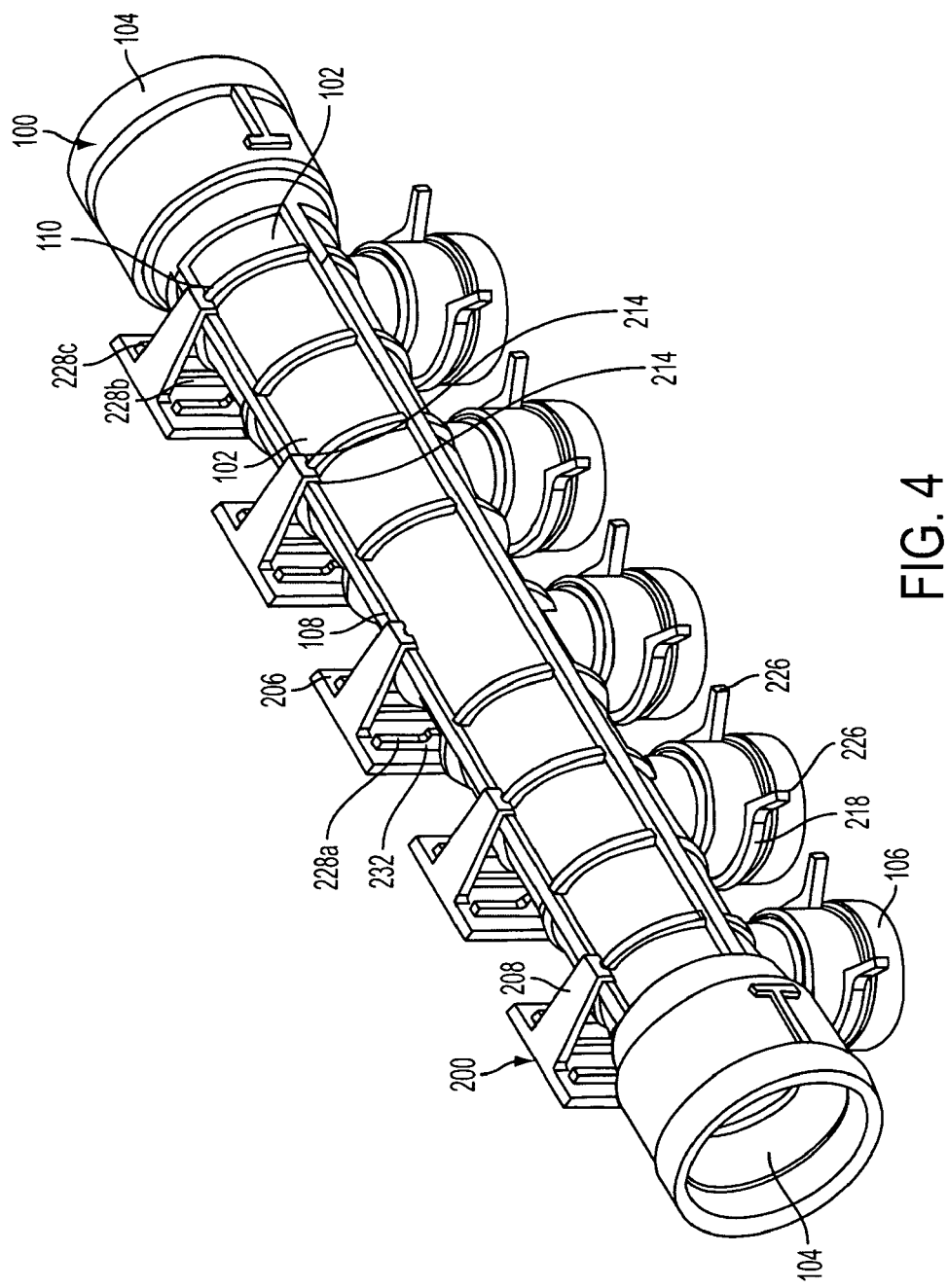
FIG. 4 is a upper back perspective view of a manifold having label plates according to the subject technology.
Figure 5:
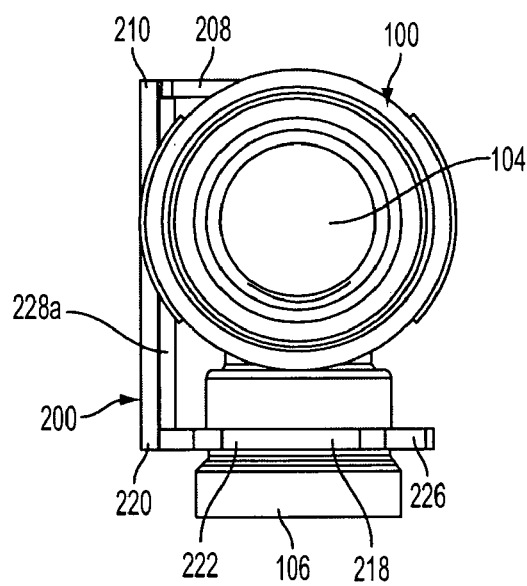
FIG. 5 is an end plan view of a manifold having label plates according to the subject technology.
Figure 6:
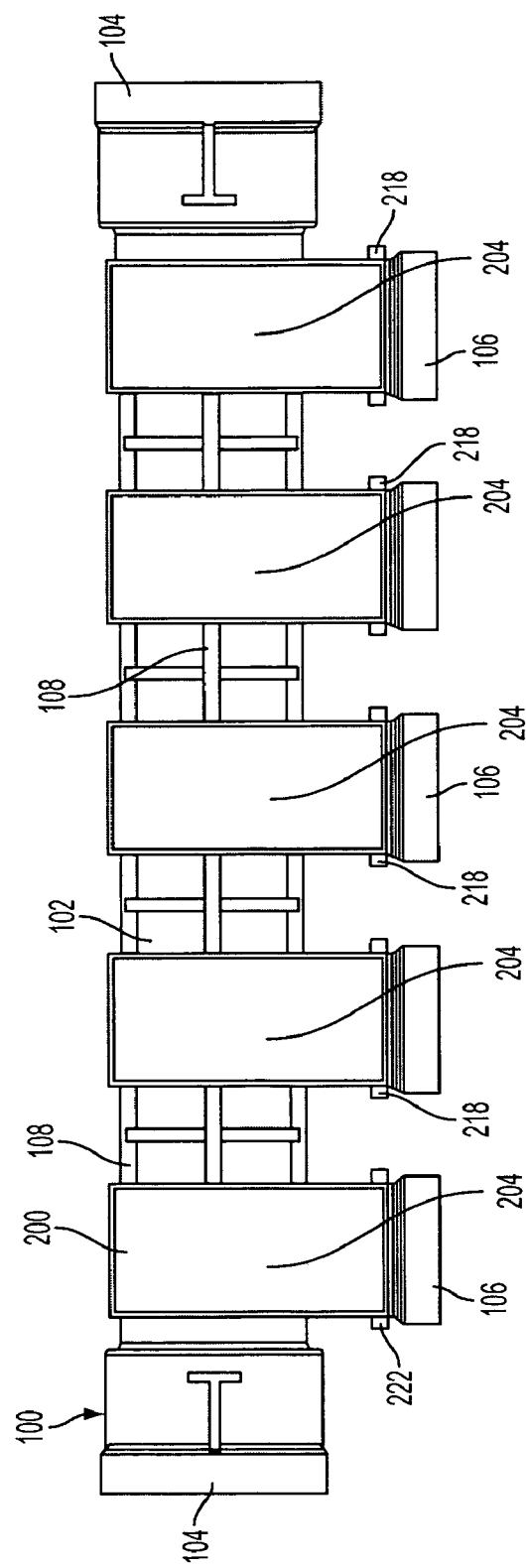
FIG. 6 is a front plan view of a manifold having label plates according to the subject technology.
Figure 7:
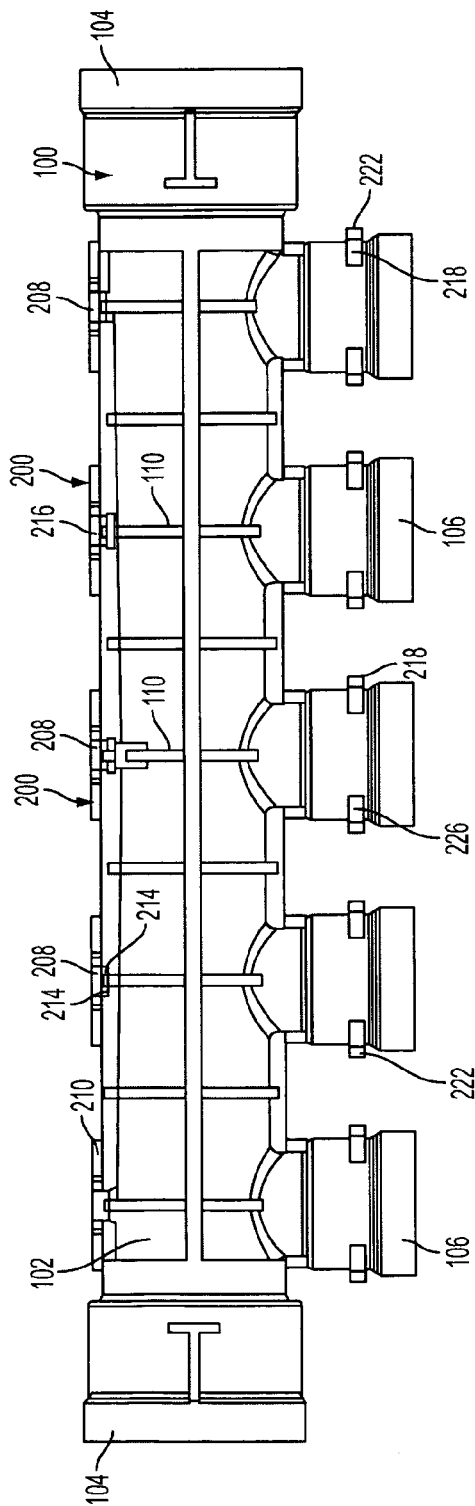
FIG. 7 is a back plan view of a manifold having label plates according to the subject technology.
Figure 8:
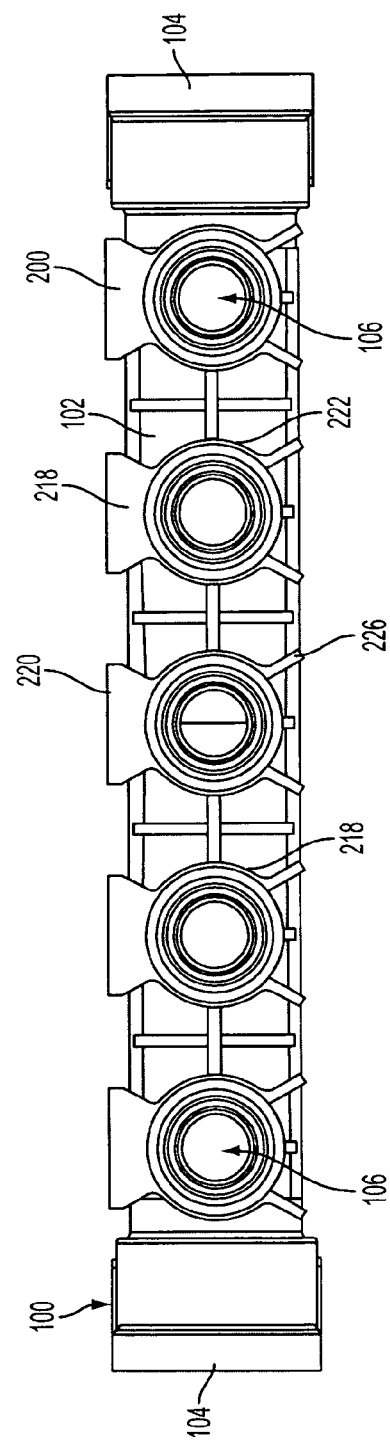
FIG. 8 is a bottom plan view of a manifold having label plates according to the subject technology.
Figure 12:
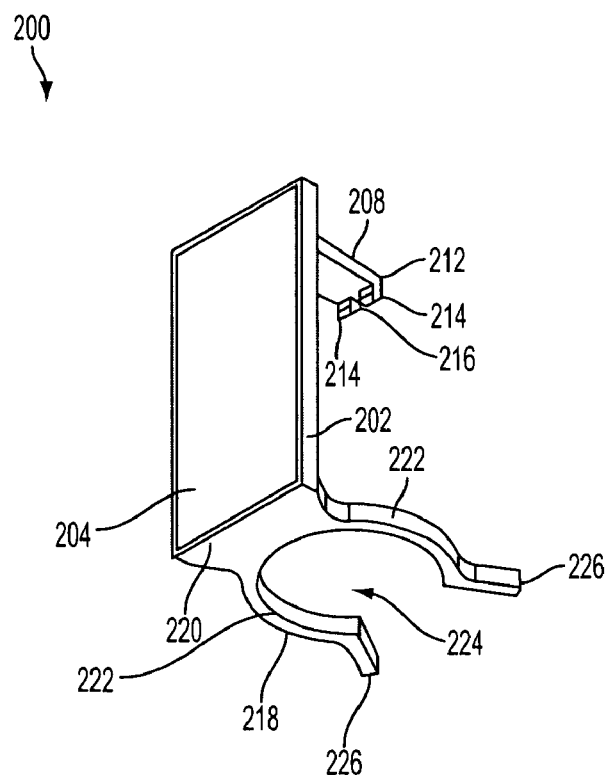
FIG. 12 is a front perspective view of a label plate according to the subject technology.

As best seen in FIGS. 4 and 12, the planar body 202 is vertically elongated with a finger 208 extending from a top portion 210 of the back side 206. The finger 208 has a distal end 212 forming two inwardly turned prongs 214 with a space 216 between the prongs 214. The prongs 214 and intermediate space 216 couple to the ridges 108, 110 of the manifold body 102. One ridge 108 extends lengthwise so that the prongs 214 are against this ridge 108 when the label plate 200 is in the display position. Another radial ridge 110 of the manifold body 102 nestles between the space 216 between the two prongs 214 in the display position.

Figure 2:
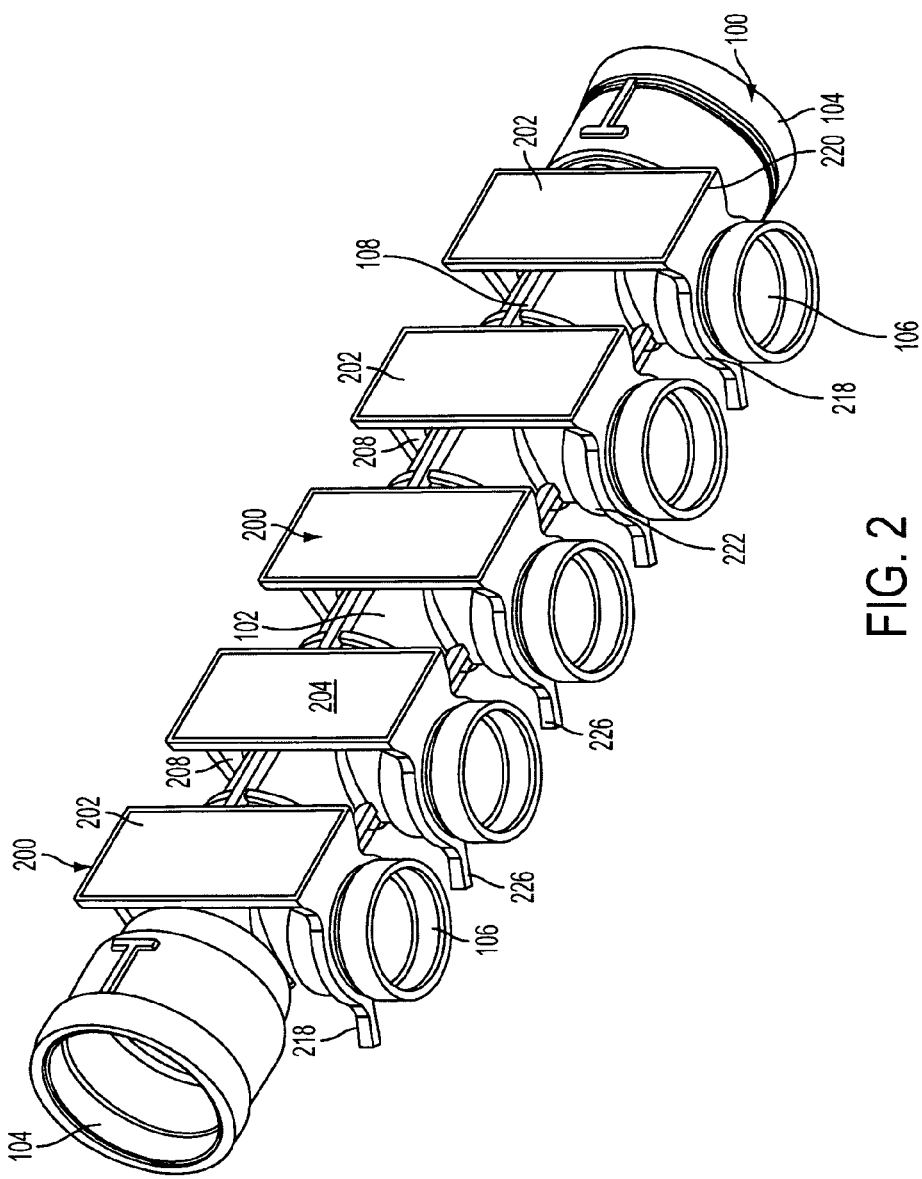
FIG. 2 is a lower front perspective view of a manifold having label plates according to the subject technology.
Figure 3:
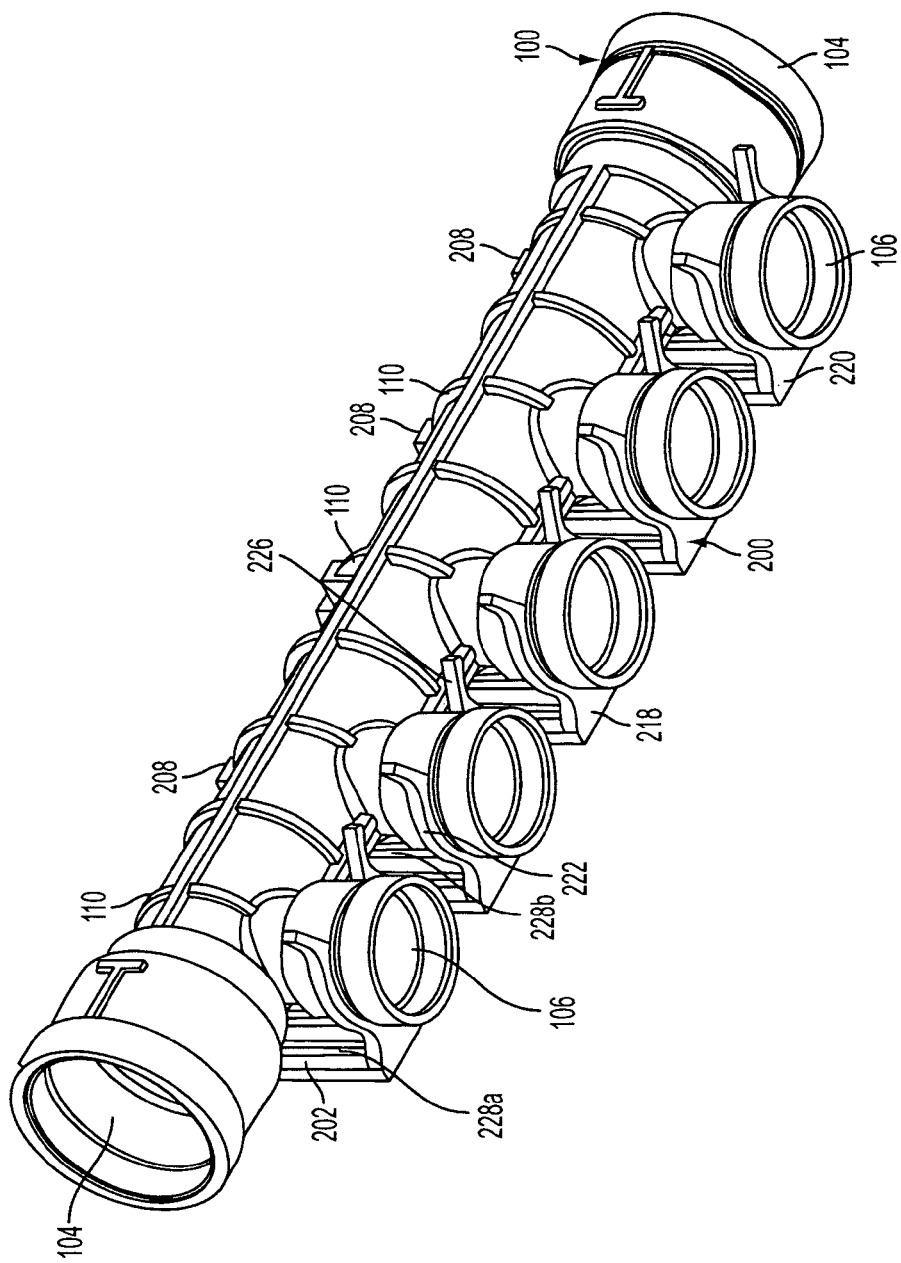
FIG. 3 is an lower back perspective view of a manifold having label plates according to the subject technology.

As best seen in FIGS. 2, 3 and 12, a collar 218 extends from a bottom portion 220 of the back side 206. The collar 218 has two arcuate arms 222 that form an opening 224 for coupling to a distribution outlet 106. The distal ends 226 of the arms 222 turn outward to facilitate easy attachment to the distribution outlet 106.

Figure 13:
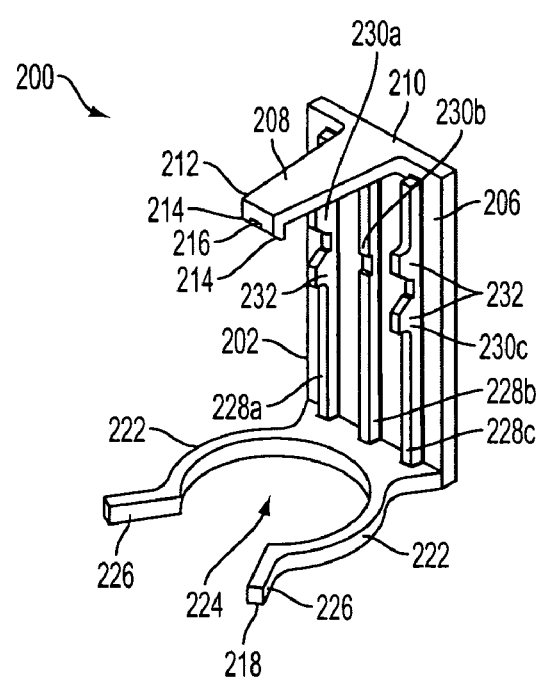
FIG. 13 is a back perspective view of a label plate according to the subject technology.
Figure 14:
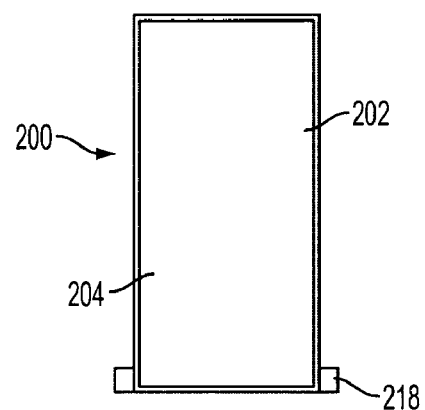
FIG. 14 is a front plan view of a label plate according to the subject technology.
Figure 15:
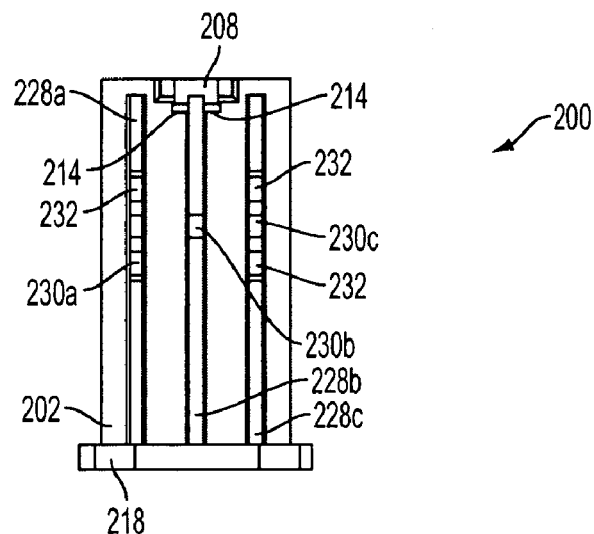
FIG. 15 is a back plan view of a label plate according to the subject technology.
Figure 16:
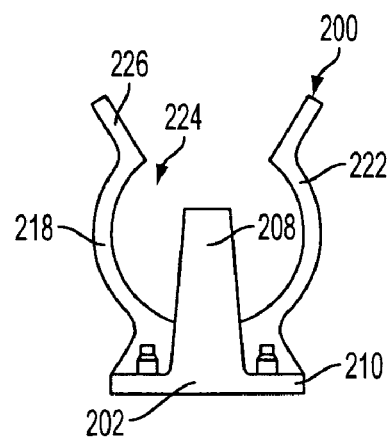
FIG. 16 is a top plan view of a label plate according to the subject technology.
Figure 17:
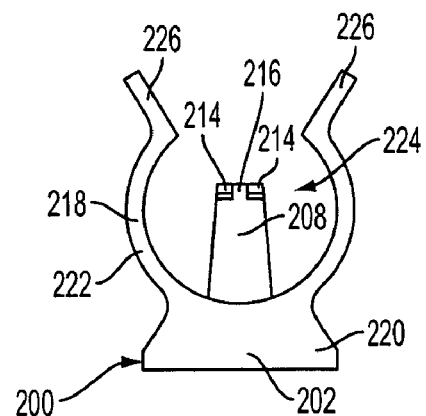
FIG. 17 is a bottom plan view of a label plate according to the subject technology.
Figure 18:
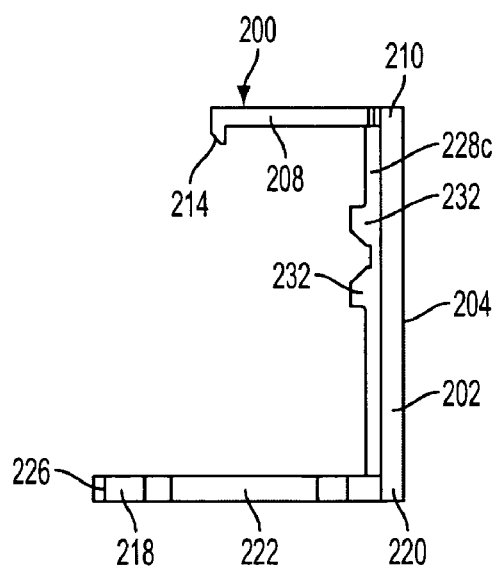
FIG. 18 is an end plan view of a label plate according to the subject technology.

As best seen in FIGS. 13, 15, and 18, the back side 206 also includes three stiffening bars 228a-c that extend the length of the planar body 202. Each stiffening bar 228a-c includes a feature 230a-c for coupling to a ridge 108 of the manifold body 102. The feature 230b of central stiffening bar 230b simply defines a channel whereas the coupling features 230a, 230c of the two outer stiffening bars 228a, 228c are a channel surrounded by projecting tabs 232. In one embodiment, the channel of the central bar 228b is rectangular shaped and the channels of the outer bars 228a, 228c are somewhat trapezoidal with arcuate sidewalls to facilitate easy attachment to the body ridge 108.

During deployment, the label plate 200 preferably flexes, in part or in whole, to make deployment easier, and allow removal/reuse with less breakage of the label plate 200. In one embodiment, the label plate 200 is fabricated from a resiliently flexible material so that the planar body 202, finger 208 and collar 218 all deform during placement on the manifold 100. In another embodiment, the label plate 200 is constructed and configured such that only the finger 208 and arms 222 deform during placement.

Figure 9:
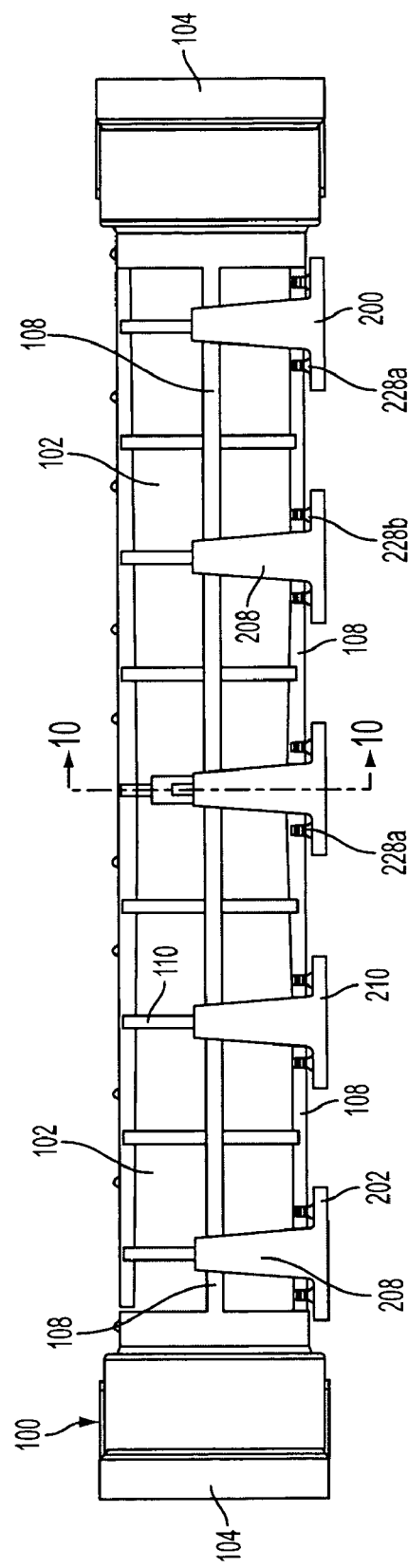
FIG. 9 is a top plan view of a manifold having label plates according to the subject technology.
Figure 10:
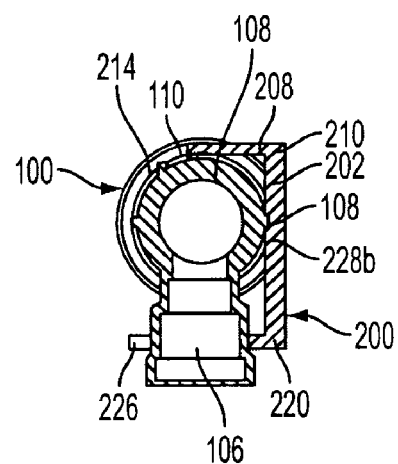
FIG. 10 is a cross-sectional view of a manifold having label plates according to the subject technology taken along line 10-10 of FIG. 9.
Figure 11:
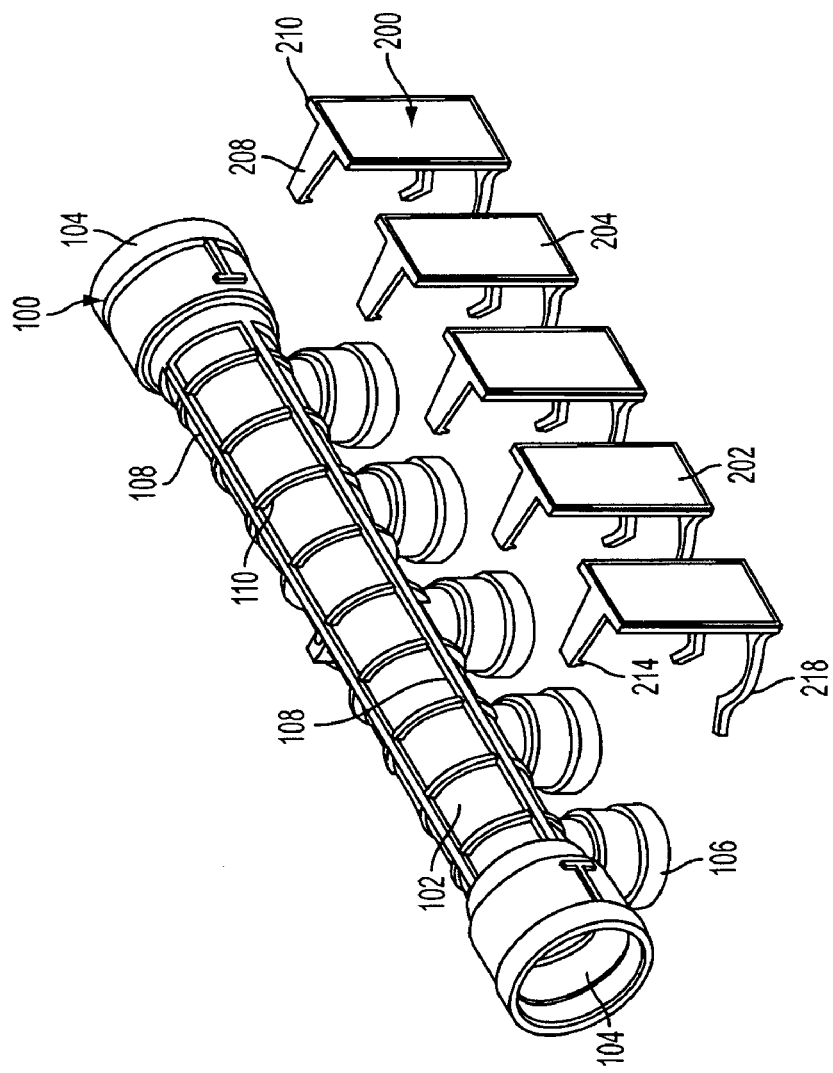
FIG. 11 is an exploded view of a manifold and label plates according to the subject technology.

Referring still to FIGS. 1-11, once deployed, the label plate 200 is retained to the manifold 100 in a stable and secure manner by having the collar 218 surrounding the respective distribution outlet 106, one lengthwise or axial manifold ridge 108 seated in the stiffening bar channels 230a-c, another lengthwise ridge 108 retained against the finger prongs 214, and a radial ridge 110 captured within the intermediate space 216 between the two prongs 214 (as best seen in FIGS. 4 and 9). The size and shape of the collar 218, ridges 108, 110, prongs 214, space 216, channels 230a-c and tabs 232 may be varied to accommodate variously configured manifolds 100 and to prevent interference with various quick connect fittings coupled thereto.

As can be seen, the lengthwise ridges 108 of the manifold body 102 are parallel and separated by approximately 90 degrees. The radial ridges 110 are also parallel with respect to one another and perpendicularly intersect the lengthwise ridges 108.

While the invention has been described with respect to preferred embodiments, those skilled in the art will readily appreciate that various changes and/or modifications can be made to the invention without departing from the spirit or scope of the invention as defined by the appended claims. For example, each claim may depend from any or all claims in a multiple dependent manner even though such has not been originally claimed.

What is claimed is:

1. A fluid distribution system comprising:
   a) an elongated manifold having a body defining a plurality of fluid ports, a lengthwise ridge, and a radial ridge; and
   b) at least one label plate having:
      i) a planar body with a front side for indicating information related to one or more ports of the plurality of ports;
      ii) a finger extending from the planar body and having a distal end 212 forming two inwardly turned prongs with a space between the prongs, wherein the prongs couple to the lengthwise ridge and the space captures the radial ridge; and
      iii) a collar extending from the planar body and coupled to a port.

2. A fluid distribution system as recited in claim 1, wherein the at least one label plate is color coded.

3. A fluid distribution system as recited in claim 1, wherein the collar has two arcuate arms that form an opening for coupling to the port and distal ends of the arms turn outward to facilitate easy attachment to the port.

4. A fluid distribution system as recited in claim 1, further comprising at least two stiffening bars on a back side of the planar body, each stiffening bar including a feature for coupling to a second lengthwise ridge on the manifold body.

5. A fluid distribution system as recited in claim 4, wherein the features are aligned channels.

6. A fluid distribution system as recited in claim 5, wherein at least one of the bars has projecting tabs surrounding the respective channel.

7. A fluid distribution system as recited in claim 4, wherein the lengthwise ridges of the manifold body are parallel and separated by approximately ninety degrees and the radial ridge substantially perpendicularly intersects the lengthwise ridges.

8. A fluid distribution system as recited in claim 1, wherein the label plate is resiliently flexible.

9. A label plate for an elongated manifold having a body defining a plurality of fluid ports, a first lengthwise ridge and a second lengthwise ridge, the label plate comprising:
   a) a planar body with a front side for indicating information related to one or more port of the plurality of ports, the planar body having at least one stiffening bar on a back side thereof with a feature for coupling to the first lengthwise ridge on the manifold body;
   b) a finger extending from the planar body and having a distal end for coupling to the second lengthwise ridge, wherein the distal end of the finger forms two inwardly turned prongs with a space between the prongs, wherein the space captures a radial ridge formed on the manifold body; and
   c) a collar extending from the planar body for coupling to a port.

10. A label plate as recited in claim 9, wherein the planar body is color coded.

11. A label plate as recited in claim 9, wherein the collar has two arcuate arms that form an opening for coupling to the port and distal ends of the arms turn outward to facilitate easy attachment to the port.

12. A label plate as recited in claim 9, wherein the at least one stiffening bar is at least two stiffening bars and the features are channels that are aligned.

13. A label plate as recited in claim 12, wherein at least one of the stiffening bars has projecting tabs surrounding the respective channel.

14. A label plate as recited in claim 9, wherein the label plate is resiliently flexible.

* * * * *